(12) United States Patent
Chatterjee et al.

(10) Patent No.: US 8,243,019 B2
(45) Date of Patent: *Aug. 14, 2012

(54) ERGONOMIC COMPUTER MOUSE

(75) Inventors: Monique Chatterjee, Seattle, WA (US);
Peter Bristol, Shoreline, WA (US); Dan Odell, Kirkland, WA (US); Steven Fisher, Kenmore, WA (US); Hugh McLoone, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,822

(22) Filed: May 23, 2011

(65) Prior Publication Data

US 2011/0221675 A1 Sep. 15, 2011

Related U.S. Application Data

(63) Continuation of application No. 11/946,883, filed on Nov. 29, 2007, now Pat. No. 7,948,474.

(51) Int. Cl.
*G09G 5/08* (2006.01)

(52) U.S. Cl. ........................................ 345/163; 345/164

(58) Field of Classification Search ........... 345/156–163
See application file for complete search history.

(56) References Cited

U.S. PATENT DOCUMENTS

| 6,556,150 B1* | 4/2003 | McLoone et al. ............... 341/20 |
| 2002/0075236 A1* | 6/2002 | Danzyger et al. ............. 345/163 |
| 2002/0105500 A1* | 8/2002 | Edwards et al. ............. 345/163 |
| 2005/0206619 A1* | 9/2005 | McLoone et al. ............. 345/163 |
| 2006/0033714 A1* | 2/2006 | Boldin ......................... 345/163 |

* cited by examiner

*Primary Examiner* — Amare Mengistu
*Assistant Examiner* — Premal Patel
(74) *Attorney, Agent, or Firm* — Alleman Hall McCoy Russell & Tuttle LLP

(57) ABSTRACT

A computer mouse for use with a computing device is provided. The computer mouse may include a mouse body with an ulnar side digit support structure having a front concave region and a rear convex region formed proximate and behind the front concave region. The front concave region may include an overhang portion on a top side and an outwardly flared region on a bottom side. The front concave region may be sized to receive a distal end of a digit of a user, and the rear convex region may be sized to support a proximate end of a digit of a user. The mouse body may additionally include a radial side digit support structure that has a concave region with an outwardly flared region on a bottom side of the concavity.

20 Claims, 3 Drawing Sheets

ERGONOMIC COMPUTER MOUSE

CROSS REFERENCE TO RELATED APPLICATIONS

This application claims priority to U.S. patent application Ser. No. 11/946,883, titled "Ergonomic Computer Mouse," and filed on Nov. 29, 2007, the entirety of which is hereby incorporated herein by reference for all purposes.

BACKGROUND

Many people spend long periods of time in front of computers engaged in leisure and work activities. Overuse of a computer mouse during such activities may cause stress to the hand and possibly lead to repetitive stress injuries. In particular, when the mouse is a poor fit for the hand causing the hand to over-extend, over-rotate, and/or excessively lift, overuse of a computer mouse may cause discomfort for the user.

SUMMARY

A computer mouse for use with a computing device is provided. The computer mouse may include a mouse body with an ulnar side digit support structure having a front concave region and a rear convex region formed adjacent and behind the front concave region. The front concave region may include an overhang portion on a top side and an outwardly flared region on a bottom side. The front concave region may be sized to receive a distal end of a digit of a user, and the rear convex region may be sized to support a proximate end of a digit of a user. The overhang portion may be configured to promote a secure purchase of the mouse by the digit during lifting. The outwardly flared region may be configured to provide underlying support for the digit. The mouse body may additionally include a radial side digit support structure having a concave region with an outwardly flared region on a bottom side of the concavity. The mouse body may further include a sloping front surface configured to support a plurality of digits of a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
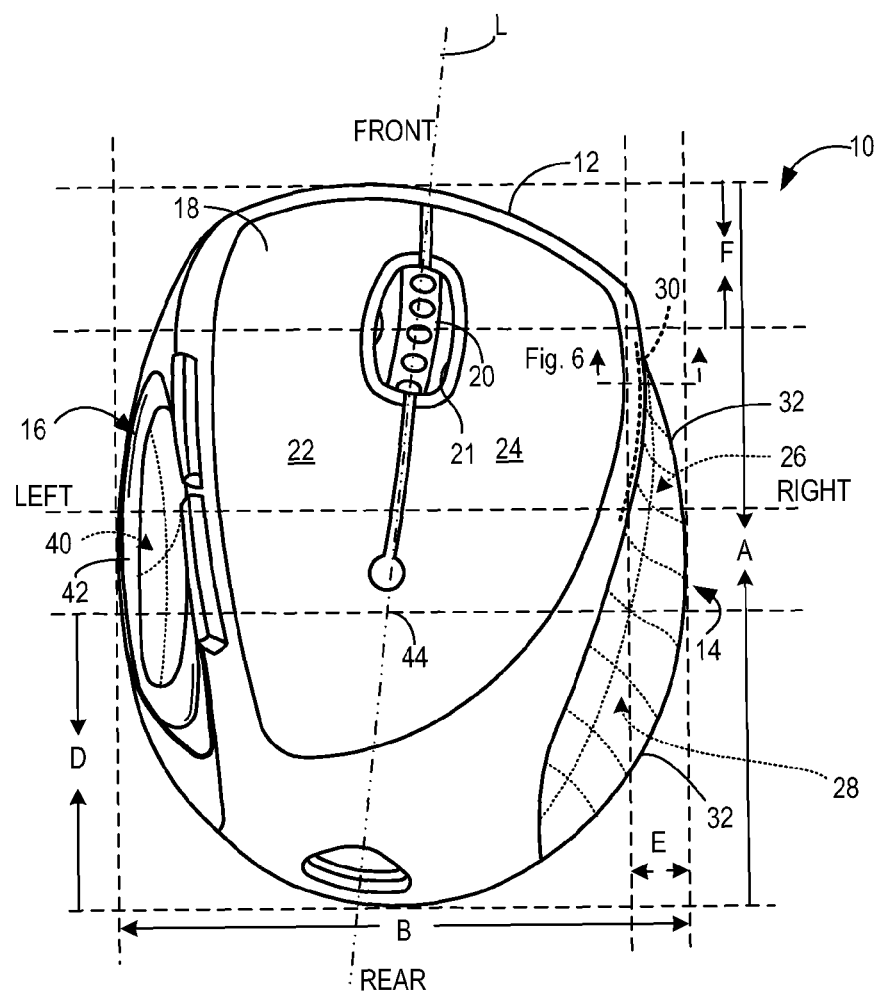
FIG. 1 is a top view of a computer mouse for use with a computing device, showing an ulnar side digit support structure having a front concave region and a rear convex region.
Figure 2:
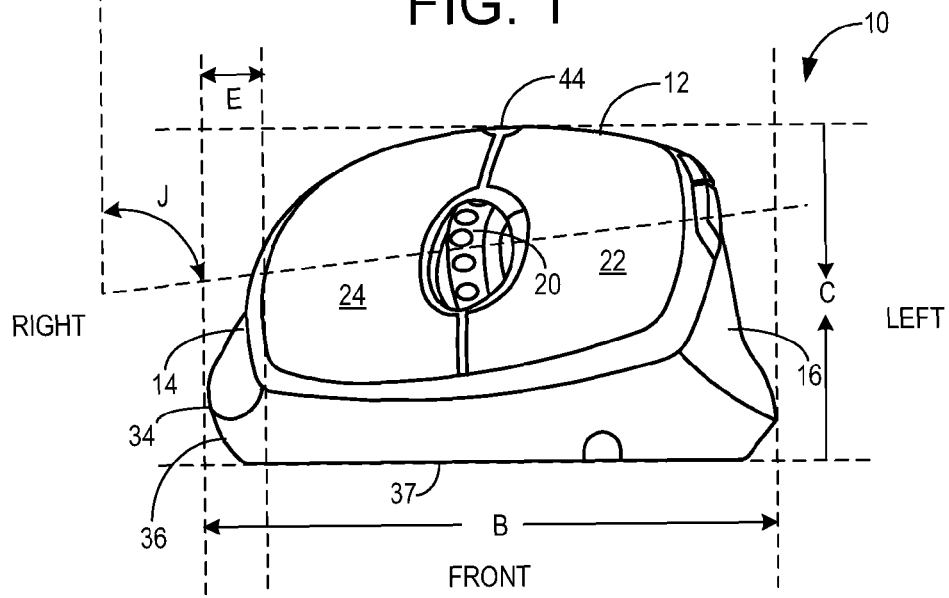
FIG. 2 is a front view of the computer mouse of FIG. 1.

FIGS. 1 to 6 illustrate various views of a computer mouse 10 for use with a computing device. As illustrated in FIGS. 1 and 2, the computer mouse 10 may include a mouse body 12 having an ulnar side digit support structure 14, a radial side digit support structure 16, and a sloping front surface 18 formed intermediate the ulnar side digit support structure 14 and the radial side digit support structure 16. As used herein the "ulnar side" refers to the side of the computer mouse 10 proximate the pinky or little finger of the user during use and the "radial side" refers to the side of the computer mouse 10 proximate the thumb of the user during use. Although a computer mouse 10 configured for right handed use is depicted in the Figures, it will be appreciated that alternatively computer mouse 10 may be configured for left handed use. The sloping front surface 18 may further include a scroll wheel 20 mounted in a slot 21 formed in the sloping front surface 18.

The ulnar side digit support structure 14 may include a front concave region 26 and a rear convex region 28, as illustrated by dotted lines showing surface curvature in FIG. 1. The rear convex region 28 may be formed proximate to, and optionally adjacent, and behind the front concave region 26. An elastomer pad, or pad of any other suitable non-slip or comfort giving material, may be provided to cover all or any portion of the front concave region 26 and rear convex region 28.

Figure 5:
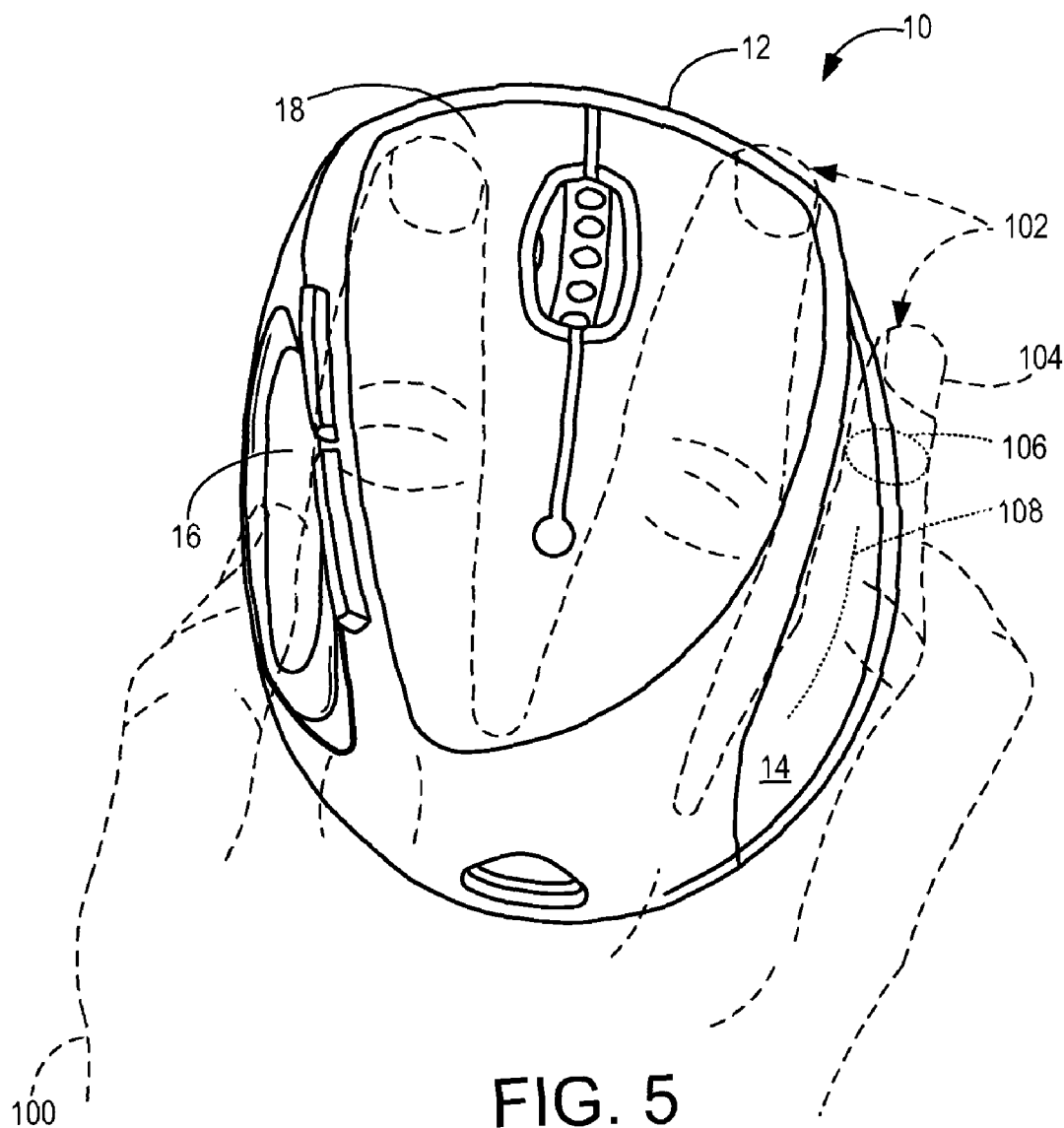
FIG. 5 is a top view of the computer mouse of FIG. 1, showing a hand positioned on the computer mouse.

As illustrated in FIG. 5, the front concave region 26 may be sized to receive a distal end of a digit 102 of a hand 100 of a user, while the rear convex region 28 may be sized to support a proximate end of the same digit 102 of the user, such as a ring finger 104 of the user. The distal end of the ring finger 104 includes a lateral curvature 106 around a cross-sectional circumference of the digit, and the proximate end of the ring finger 104 includes a longitudinal curvature 108 along an anterior length of the ring finger 104, as the joints of the ring finger 104 are in flexion during use of the computer mouse 10. The front concave region 26 is sized to receive the lateral curvature 106 of the ring finger 104 of the user, and the rear convex region 28 is sized to receive the longitudinal curvature 108 of the ring finger 104 in flexion.

Figure 3:
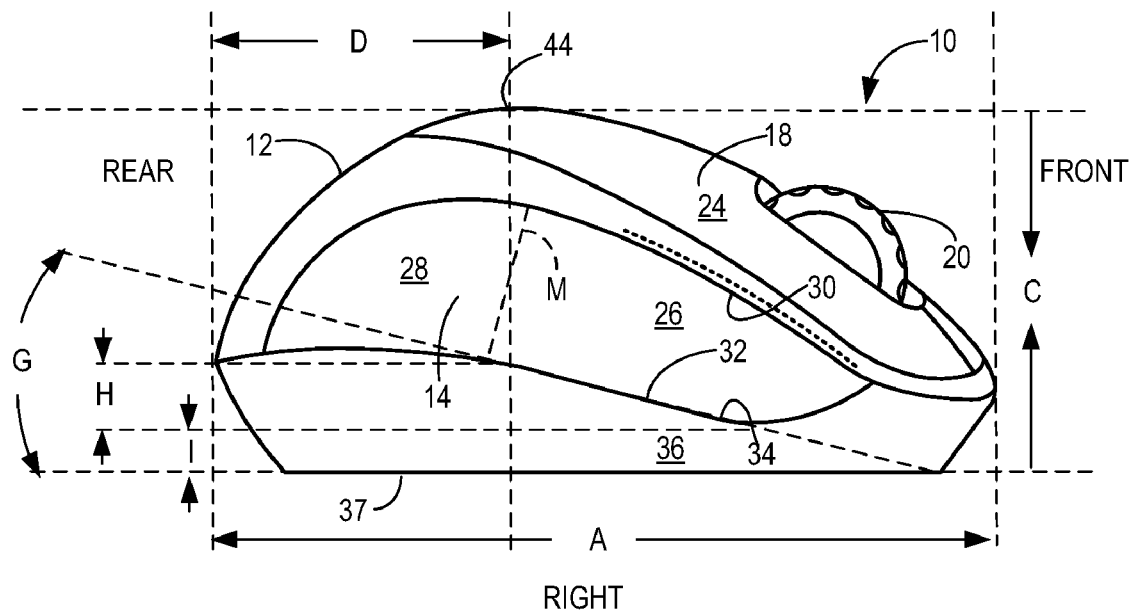
FIG. 3 is a right side view of the computer mouse of FIG. 1.
Figure 6:
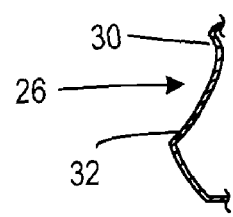
FIG. 6 is a cross section of the front concave region of ulnar side digit support structure of the computer mouse of FIG. 1.

As illustrated in FIG. 6, the front concave region 26 of the ulnar side digit support structure 14 may include an overhang portion 30 positioned on a top side of the front concave region and may include an outwardly flared portion 32 on a bottom side of the front concave region. The overhang portion 30 may be configured to slightly flare outward to promote a secure purchase of the mouse 10 by the digit during lifting. The length of the overhang portion along the top side of the front concave region 26 is illustrated by a dotted line along the overhang portion 30 in FIG. 1. As illustrated in FIG. 3 by the dotted line along the overhang portion 30, the length of the overhang portion extends from a front end of the front concave region 26 and terminates in a region forward of and proximate to the transition M, between front concave region 26 and rear convex region 28.

The outwardly flared portion 32 may extend outwardly laterally further than the overhang portion 30 and may be configured to provide underlying support for the digit, reducing stress to the digit. The outwardly flared portion 32 may laterally extend beyond the sloping front surface 18, for example, by about 8 to about 10%, and in some embodiments 9% of a width of the mouse body 12, as indicated at E, at about 45% to about 55% of the length of the body, and in some embodiments 50%, lengthwise from the rear of the mouse body 12. For example, the outwardly flared portion 32 may extend about 5 to about 7 mm, and in some embodiments 6 mm, laterally from the sloping front surface 18 at about 45% to about 55% of the length of the body, and in some embodiments 50%, lengthwise from rear of the mouse body 12.

The outwardly flared portion 32 may extend back towards a rear of the mouse body 12 and into the rear convex region 28, providing additional support to the digit. In some embodiments, the overhang portion 30 may also extend rearward into the rear convex region 28, although in the depicted embodiment the overhang portion terminates proximate to the rear convex region 28, as indicated by the dotted line formed along the overhang portion 30 in FIG. 3.

As shown in FIG. 2, the outwardly flared portion 32 may include an edge 34 substantially along its outermost extent. As shown in FIG. 3, the edge 34 may extend from a front of the mouse body 12, towards a rear of the mouse body 12, running along the outermost extent of the rear convex region 28. Both the front concave region 26 and the rear convex region 28 of the ulnar side digit support structure may be positioned above the edge 34.

Figure 4:
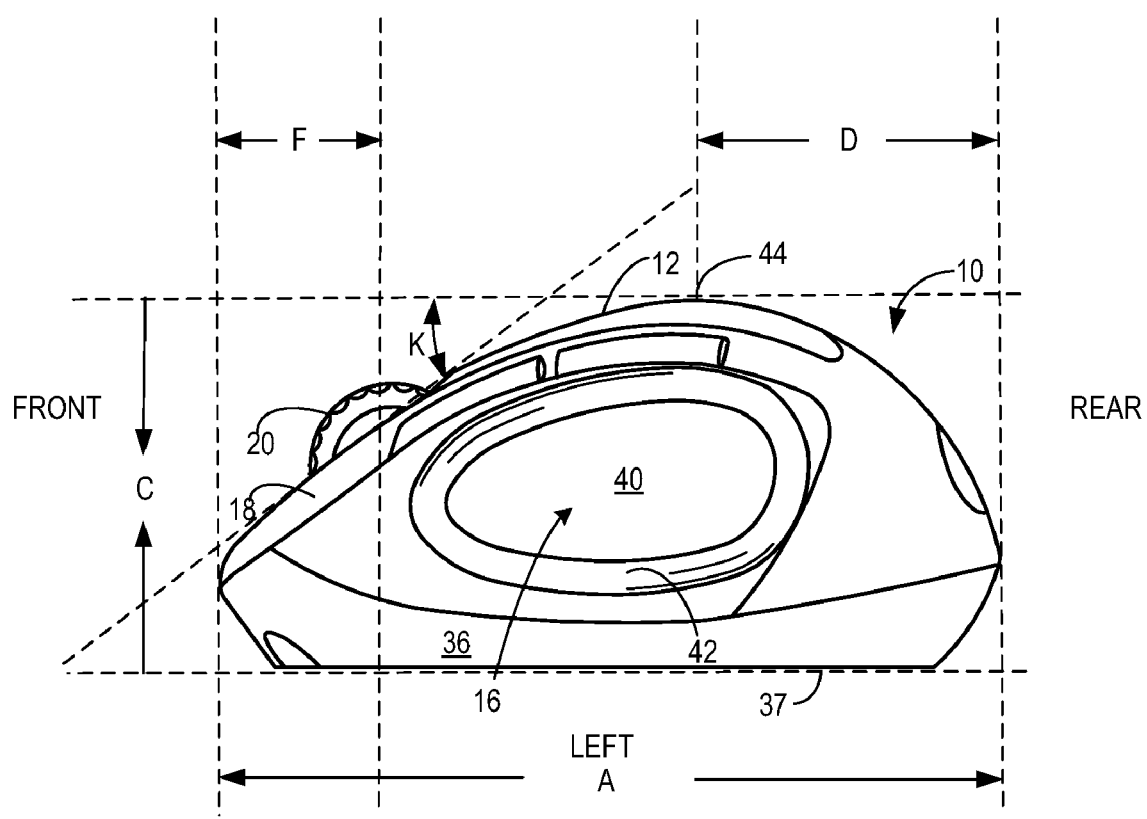
FIG. 4 is a left side view of the computer mouse of FIG. 1.

As shown in FIG. 2-4, a base 36 with an inwardly sloping outer surface 38 may be formed below the edge 34. As shown in FIG. 5, the edge 34 and base 36 may be configured to curve to fit a curve of a pinky finger and to support the pinky finger, allowing the pinky finger to rest comfortably on the base without over extension of the pinky finger or over rotation of the wrist.

As illustrated in FIG. 3, the edge 34 may be angled downward from a rear to a front of the mouse body 12, for example at about 12 to about 16 degrees, and in some embodiments 14.5 degrees, as indicated by G, in relation to a bottom of the mouse body 12, at about 45% to about 55% of the length of the body, and in some embodiments 50%, lengthwise from a rear of the of the mouse body 12.

The edge 34 may be vertically spaced apart from a bottom 37 of the mouse body 12. For example, the edge 34 may be vertically spaced apart from a bottom 37 of the mouse body 12 by about 13.8±0.5 mm, as indicated at H, measured at about 35% to about 45% lengthwise from a rear of the mouse body 12, and by about 5.8±0.2 mm, as indicated at I, measured at about 15% to about 25% lengthwise from a front of the mouse body 12.

As illustrated in FIG. 4, the radial side digit support structure 16 may include a concave region 40 with an outwardly flared region 42 on a bottom side of the concave region 40. The outwardly flared region 42 may be configured to receive and provide support to a thumb of the user, reducing stress of the thumb.

As illustrated in FIG. 1, the sloping front surface 18 may include a longitudinal axis L. The scroll wheel 20 may be mounted along the longitudinal axis L. A center of the scroll wheel 20 may be positioned at about 18% to about 22% lengthwise from a front of the mouse body 12, as indicated by F. In one particular example, a center of the scroll wheel 20 may be positioned at about 20% of the length of the mouse body from a front of the mouse body 12.

A left portion and a right portion of the sloping front surface 18 may be positioned on either side of the scroll wheel 20 and configured as left mouse button 22 and right mouse button 24, respectively. As illustrated in FIGS. 1 and 4, an apex 44 of the sloping front surface 18 may be formed on the sloping front surface, for example, at about 36% to about 44% lengthwise from a rear of the mouse, as indicated by D. In one particular example, the apex 44 of the sloping front surface 18 may be formed at about 40% lengthwise from a rear of the mouse. As shown in FIG. 5, the sloping front surface 18 may be configured to support a plurality of other digits of a user, such as an index finger and a middle finger of a user.

As illustrated in FIG. 2, the sloping front surface 18 may be sloped from a radial side to an ulnar side of the mouse body 12 (left to right in the depicted embodiment), for example at about 75 to about 89 degrees at about 18% to about 22% lengthwise from a front of the mouse body 12, as indicated by J. In one particular example, the sloping front surface 18 may be sloped at 84 degrees measured at about 20% lengthwise from a front of the mouse body 12.

As illustrated in FIG. 4, the sloping front surface 18 may be sloped from the rear of the mouse to the front of the mouse. For example, the angle of sloping for the sloping front surface 18, sloping from the rear of the mouse to the front mouse, may be about 29 degrees to about 35 degrees at about 18% to about 22% lengthwise from a front of the mouse body 12, as indicated by K. In one particular example, the angle of sloping for the sloping front surface 18, sloping from the rear of the mouse to the front of the mouse, may be 32 degrees, measured at about 20% lengthwise from a front of the computer mouse.

The overall length to width ratio of the mouse body 12 may be about 76:74 to about 94:60, the overall width to height ratio of the mouse body 12 may be about 60:44 to about 74:36, and the overall length to height ratio of the mouse body 12 may be about 76:44 to about 94:36. In one particular example, the overall length to width ratio of the mouse body 12 may be about 85:67, the overall width to height ratio of the mouse body 12 may be about 67:40, and the overall length to height ratio of the mouse body 12 may be about 85:40. As shown in FIG. 1, the overall length of the mouse body 12, as indicated by A, may be about 85±9 mm, the overall width of mouse body 12, as indicated by B, may be about 67±9 mm, and the overall height of the mouse body 12, as indicated by C, may be about 40±4 mm. In one particular example, the overall length of the mouse body 12 may be about 85 mm, the overall width of mouse body 12 may be about 67 mm, and the overall height of the mouse body 12 may be about 40 mm.

The above described computer mouse exhibits external contours that match curves of a hand of the user, thereby facilitating a comfortable, natural and secure grip.

It will be appreciated that the above described computer mouse may be configured for use with a computing device such as a mainframe computer, personal computer, laptop computer, portable data assistant (PDA), gaming device, computer-enabled wireless telephone, networked computing device, or other suitable computing device. These computing devices typically include a processor and associated volatile and non-volatile memory, and are configured to execute programs stored in non-volatile memory using portions of volatile memory and the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computer mouse for use with a computing device, the computer mouse comprising a mouse body, including:

an ulnar side digit support structure positioned on an ulnar side of the mouse body having a front concave region and a rear convex region formed proximate and behind the front concave region, the front concave region including an overhang portion on a top side of the front concave region and an outwardly flared portion on a bottom side of the front concave region, the front concave region being sized to receive a distal end of a digit of a user, and the rear convex region being sized to support a proximate end of the digit of a user, the overhang portion being slightly flared outward, and the outwardly flared portion being configured to provide underlying support for the digit, the outwardly flared portion of the ulnar side digit support structure including an edge substantially along its outermost extent, the front concave region being positioned above the edge, and a base with an inwardly sloping outer surface is formed below the edge, the digit that the ulnar side digit support structure is configured to receive being a ring finger and the base being configured to support a pinky finger, the edge separating the ulnar side digit support structure from the base, the edge being vertically spaced apart from a bottom of the mouse body and angled downward from a rear to a front of the mouse body; and a sloping front surface formed intermediate the ulnar side digit support structure and a radial side of the mouse body and configured to support a plurality of other digits of the user.

2. The computer mouse of claim 1, wherein an angle of sloping of the sloping front surface from the front of the mouse to the rear of the mouse is between 29 and 35 degrees.

3. The computer mouse of claim 1, further comprising a left mouse button and a right mouse button substantially laterally spanning the sloping front surface.

4. The computer mouse of claim 1, further comprising an elastomer pad covering a portion of the front concave region.

5. The computer mouse of claim 1, further comprising an elastomer pad covering a portion of the rear convex region.

6. The computer mouse of claim 1, wherein the edge of the outwardly flared portion runs along the outermost extent of the rear convex region.

7. The computer mouse of claim 1, further comprising:

a scroll wheel mounted along a longitudinal axis of the sloping front surface, wherein a left and a right portion of the sloping front surface are positioned on either side of the scroll wheel and are configured as a left mouse button and a right mouse button.

8. A computer mouse for use with a computing device, the computer mouse comprising a mouse body, including:

an ulnar side digit support structure positioned on an ulnar side of the mouse body having a front concave region and a rear convex region formed proximate and behind the front concave region, the front concave region including an overhang portion on a top side of the front concave region and an outwardly flared portion on a bottom side of the front concave region, the front concave region being sized to receive a distal end of a digit of a user, and the rear convex region being sized to support a proximate end of the digit of a user, the overhang portion being slightly flared outward, and the outwardly flared portion being configured to provide underlying support for the digit, the outwardly flared portion of the ulnar side digit support structure extends laterally beyond the sloping front surface by about 8% to about 10% of a width of the mouse body, the outwardly flared portion of the ulnar side digit support structure including an edge substantially along its outermost extent, the front concave region being positioned above the edge, the edge being vertically spaced apart from a bottom of the mouse body and angled downward from a rear to a front of the mouse body; and a sloping front surface formed intermediate the ulnar side digit support structure and a radial side of the mouse body and configured to support a plurality of other digits of the user.

9. The computer mouse of claim 8, wherein the outwardly flared portion of the ulnar side digit support structure extends laterally further than the overhang portion.

10. The computer mouse of claim 9, wherein the outwardly flared portion of the ulnar side digit support structure extends laterally beyond the sloping front surface by about 8% to about 10% of a width of the mouse body at about 45% to about 55% of a length of the mouse body from the rear of the mouse body.

11. The computer mouse of claim 9, wherein the outwardly flared portion of the ulnar side digit support structure extends laterally beyond the sloping front surface by about 5 mm to about 7 mm to laterally from the sloping front surface at about 45% to about 55% of a length of the mouse body from the rear of the mouse body.

12. The computer mouse of claim 8, wherein a base with an inwardly sloping outer surface is formed below the edge;

wherein the digit that the ulnar side digit support structure is configured to receive is a ring finger and the base is configured to support a pinky finger; and wherein the edge separates the ulnar side digit support structure from the base.

13. The computer mouse of claim 12, wherein the edge is angled downward from the rear to the front of the mouse body about 12 degrees to about 16 degrees at about 45% to about 55% lengthwise from the rear of the mouse body.

14. The computer mouse of claim 12, wherein the edge is formed at about a 14.5 degree angle at about 50% lengthwise from the rear of the mouse body.

15. A computer mouse for use with a computing device, the computer mouse comprising a mouse body, including:

an ulnar side digit support structure positioned on an ulnar side of the mouse body having a front concave region and a rear convex region formed proximate and behind the front concave region, the front concave region including an overhang portion on a top side of the front concave region and an outwardly flared portion on a bottom side of the front concave region, the front concave region being sized to receive a distal end of a digit of a user, and the rear convex region being sized to support a proximate end of the digit of a user, the overhang portion being slightly flared outward, and the outwardly flared portion being configured to provide underlying support for the digit, the outwardly flared portion of the ulnar side digit support structure including an edge substantially along its outermost extent, the front concave region being positioned above the edge, and a base with an inwardly sloping outer surface is formed below the edge, the edge being vertically spaced apart from a bottom of the mouse body and angled downward from a rear to a front of the mouse body, the sloping front surface sloped at an angle between 29 and 35 degrees from the front of the mouse to the rear of the mouse; and a sloping front surface formed intermediate the ulnar side digit support structure and a radial side of the mouse body and configured to support a plurality of other digits of the user.

16. The computer mouse of claim 15, wherein the sloping front surface is sloped from the radial side of the mouse body to the ulnar side of the mouse body at about 75 degrees to about 93 degrees, measured at about 18% to about 22% lengthwise from the front of the mouse body.

17. The computer mouse of claim 15, wherein an angle of sloping for the sloping front surface, sloping from the rear of the mouse body to the front of the mouse body, is about 29 degrees to about 35 degrees at about 18% to about 22% lengthwise from the front of the mouse body.

18. The computer mouse of claim 15, further comprising a left mouse button and a right mouse button substantially laterally spanning the sloping front surface.

19. The computer mouse of claim 18, further comprising a scroll wheel mounted along a longitudinal axis of the sloping front surface and positioned between the left and right mouse buttons.

20. The computer mouse of claim 15, wherein the edge of the outwardly flared portion runs along the outermost extent of the rear convex region.

* * * * *